UNITED STATES PATENT OFFICE 2,415,878

METHOD FOR DEHYDRATION

William J. Hale, Midland, Mich., assignor to National Agrol Company, Inc., Washington, D. C.

No Drawing. Application November 18, 1942, Serial No. 466,064

7 Claims. (Cl. 260—681)

This invention relates to dehydration of ketones and dealcoholation of ketone acetals, and more particularly to the formation of conjugated dienes from ketones.

Among the objects of this invention are the provision of a method for the dehydration of ketones; the provision of a method for dealcoholating acetals of ketones, such as acetone diethyl acetal, to form unsaturated ethers; the provision of a method for simultaneously dealcoholating and coupling acetone acetals to form conjugated dienes; and the provision of a method for selectively carrying out such dealcoholation and coupling to form desired dienes. Other objects will be in part obvious and in part pointed out hereinafter.

The invention accordingly comprises the steps and sequence of steps, and features of synthesis, analysis, or metathesis, which will be exemplified in the processes hereinafter described, and the scope of the application of which will be indicated in the following claims.

Acetone may be alcoholated with ethyl alcohol to form a diacetal, and this diacetal may be partially dealcoholated to form an unsaturated ether followed by reaction of this ether with ethylene to form a conjugated diene. The course of the reactions may be represented as follows:

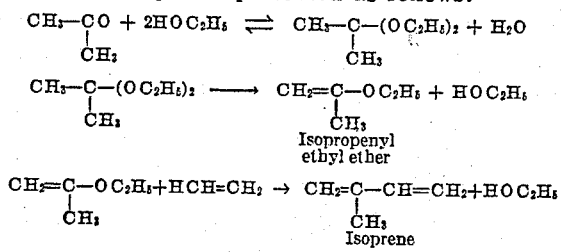

The above reactions are carried out by means of a composite catalyst. This catalyst is effective for the acetalization and dealcoholation, as well as the subsequent reaction with ethylene to form the conjugated diene.

One of the constituents of the present catalyst is an acidic anhydride or anhydrides of one or more of the metals of family A of both groups V and VI of the periodic system of elements. These metals are vanadium, columbium, tantalum, chromium, molybdenum, tungsten and uranium. The anhydrides of these metals constitute the starting point for preparing especially active dehydrative oxides. Reduction of these acidic anhydrides by hydrogen or other reducing agents yields respectively lower oxides of approximately the following composition: $V_2O_3\pm$, $Cb_2O_3\pm$, $TaO_2\pm$, $Cr_2O_3\pm$, $Mo_2O_3\pm$, $W_2O_5\pm$ and $UO_2\pm$ provided the reducing conditions, such as the temperature, are not too drastic. Even at a temperature of 500° C. molybdenum, and at a temperature of 1050° C. tungsten, in metallic form may make their appearance. The partially reduced oxides have definite dehydrative characteristics. The metals themselves of groups V and VI are unsuitable.

The reduced dehydrative oxides are provided with a base metal with which they are held in combination. This base metal holds the reduced acid anions in a definite structure important to their dehydrative activity. Among the base metals which may be employed are the following: beryllium, magnesium, zinc, cadmium, aluminum, thallium, tin, lead, bismuth and alloys of two or more of these.

In the copending application of William J. Hale and Harry Miller, Serial No. 451,320, is shown the effect of the inclusion in the catalyst of a number of refractory acid oxides capable of forming polyacid anions with the acidic anhydrides above referred to. The polyacid anions such as silicotungstic, phosphomolybdic and many others offer high resistance to prolonged reducing action of hydrogen and other reducing agents, so that oxygen still remains associated with the active catalytic agents. The oxygen is diminished only to the point where the structure of the molecule is definitive of enhanced dehydrative (hydrative) activity on the part of the catalyst. The presence of these refractory oxides contributes substantially to the rigidity of the catalytic mass, even though reduction has been carried out at temperatures as high as 1000° C.

A composite catalyst as above described presents a strong and persistent lattice structure underlain by a refractory type of oxide. It presents in addition a storehouse of potential deoxidation from within; the excess of base metal or their alloys serve as reduction reserves.

Among the refractory oxides particularly serviceable within the purview of the present invention may be noted the oxides of boron, silicon, titanium, zirconium, cerium and the rare earth metals, thorium and phosphorus.

An additional component for the catalyst which is desirable is a metal which may be characterized as of the noble or near-noble type. Among these are copper, silver, gold, mercury, ruthenium, rhodium, palladium, osmium, iridium, and platinum, all of which function as dehydrogenative (hydrogenative) agents. When these metals as cations are brought into combination with the dehydrative anions (containing the elements of family A of both groups V and VI referred to above), and the resulting compounds are reduced in a current of hydrogen or by means of another reducing agent, there is obtained an unusually active condensative catalyst.

Similarly, the above-mentioned refractory oxides can unite with the cations of the dehydrogenative (hydrogenative) metals to give salts partially reducible by hydrogen or other reducing agents to a point where condensative activity of the compound is marked and stable. Likewise, these refractory oxides prevent any too great a reduction of such compounds to the point where the dehydrogenative metals are liberated. As long as there is sufficient refractory oxide to hold these dehydrogenative metals in combination, heating under drastic reducing conditions is substantially completely unable to remove the dehydrogenative metal from such compounds. A compound of lower oxidized form is, however, obtained.

Accordingly, by coordinate combination of a refractory oxide or a mixture of several refractory oxides with the dehydrative acidic oxides and the oxides of dehydrogenative metals, followed by partial reduction, a composition is obtained which is stable even to prolonged reduction at red heat and which will exhibit both dehydrative and condensative activity. The formula for an exemplary compound before reduction may be illustrated as follows:

Cu.O.WO.O.ZrO.O.WO.Cu

In accordance with the present invention therefore a compound catalyst is provided which has a rigid structure, and which functions both as a highly active dehydrator (hydrator) and likewise as a condensator or coupler, the active components of which are embedded in a storage house of reductor. The catalyst may be distributed over an inert carrier, if desired, but this is in no way essential.

The embodiment of the present catalyst containing dehydrogenative metals and their salts inhibits markedly any undesirable end-to-end condensations. This is true even though relatively higher temperatures are utilized. Such temperatures have a tendency to favor such end-to-end condensations, but such condensations are repressed by the presence of dehydrogenative metals.

In general the catalyst is prepared by mixing the base metal, preferably in granular form, with one or more of the refractory oxides, one or more of the acidic anhydrides of metals of group V and group VI of the periodic table and, if desired, with one or more dehydrogenative metals or compounds of such metals such that the granules of base metals are thinly coated with the refractory oxides and other addition agents. The whole is then well triturated and roasted to the point of incipient fusion of the base metal, usually 400–800° C., cooled, and further subjected to the reducing action of a reducing agent, when desirable. The refractory oxides should be present in sufficient amount to hold the dehydrogenative metal in combination and to prevent by the formation of polyacid anions complete reduction of the catalyst.

The great ease with which ordinary acetone diethyl acetal is hydrolyzed, even by water containing as little as 1/100 of 1% of acid, requires elimination of as much water as possible throughout the process where acetone diethyl acetal is introduced into the system. Whatever hydrolysis occurs is immediately registered by the appearance of free acetone. Acetone itself reacts somewhat differently with ethylene.

The tautomeric form of acetone, that is, alpha methyl vinyl alcohol

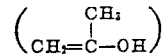

may interact with ionized ethylene to give 2-methyl butadiene (isoprene). On the other hand, completely dehydrated acetone, methyl acetylene may condense with ethylene in either of two ways, one of which gives isoprene by the hydrogen ion attaching itself to the methine radical and the hydrocarbon residue attaching itself to the methyl-carrying carbon atom. Alternatively, the condensation may occur to give 1-methyl butadiene (piperylene) by the hydrogen ion of the ethylene attaching itself to the methyl-carrying carbon atom and the hydrocarbon residue attaching to the methine group:

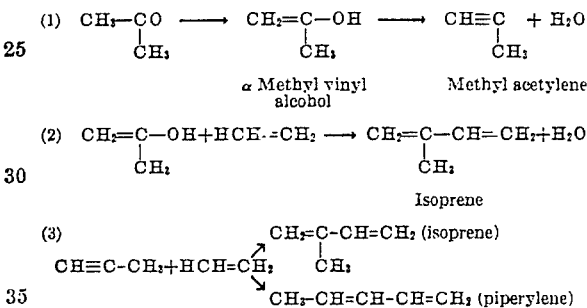

The higher the temperature the more likely is the total dehydration of the acetone to form methyl acetylene and consequent coupling of the ethylene therewith, as in Equation 3 above. It will be noted that in this equation both isoprene and piperylene are simultaneously produced. This occurs in the proportion of about 1 part isoprene to 2 parts piperylene. If the interaction of the ethylene is permitted to proceed with isopropenyl ethyl ether resulting through partial dealcoholation of acetone diethyl acetal, as above stated, at as low temperatures as possible, for example, 120–135° C., the product is substantially completely isoprene and unacted upon isopropenyl ethyl ether.

*Example 1*

A catalyst was prepared in the following manner: To 100 parts of a base metal such as 20-mesh granular aluminum were added 1–2 parts of boric acid, 6 parts of tungstic anhydride, 2 parts of uranic anhydride, and 3 parts of silver nitrate. The whole was then well triturated to thinly coat the aluminum granules with the additive agents and roasted to a point of approximately 650° C. It was cooled and subjected to the reducing action of hydrogen at approximately 300° C., after which it was ready for use.

100 g. of this catalyst were placed in a combustion tube of about 7/8" internal diameter, and the temperature brought to approximately 150–160° C. The vapors of 20 g. of acetone and 5 liters of ethylene were passed through the tube during the course of half an hour. There was collected in the receiver 3 g. of isoprene and 7 g. of piperylene, calculating to a 43.3% conversion. There was also obtained a small quantity of unacted upon acetone and water.

Example 2

A catalyst was prepared by adding 1-2 parts of freshly precipitated silicic acid, 2 parts of columbium pentoxide, 8 parts of tungstic anhydride, and 3 parts of silver nitrate to 100 parts of a base metal such as 20-mesh aluminum. The whole was then well triturated, roasted to approximately 650° C., cooled and subjected to the reducing action of hydrogen at approximately 350° C.

100 g. of this catalyst were placed in a combustion tube maintained at a temperature of approximately 130–135° C., and the vapors of 20 g. of isopropenyl ethyl ether, together with 5 liters of ethylene were passed thereover in the course of twenty minutes. There was recovered in the receiver 6½ g. of isoprene, calculating to a 41.1% conversion, together with alcohol and unacted upon isopropenyl ethyl ether.

Example 3

Over the catalyst described in Example 2 there was passed the vapors of 10 g. of acetone diethyl acetal and 10 g. of isopropenyl ethyl ether, together with 5 liters of ethylene at 130–135° C. There was recovered in the receiver 8 g. of isoprene, calculating to a 61% conversion, together with alcohol and unacted upon isopropenyl ethyl ether with scarcely a trace of acetal.

Example 4

Example 3 was repeated, but the vapors were passed over the catalyst under a pressure of 5 atmospheres. A conversion of 66% to isoprene was obtained.

Example 5

Using the catalyst described in Example 2, acetophenone diethyl acetal was partially dealcoholated into alpha ethoxy styrene, which in turn was caused to react in the presence of the catalyst with ethylene at approximately 225° C. 2-phenyl butadiene was thereby obtained.

The present invention, it will be noted, provides a method for selectively dehydrating and coupling ketones such as acetone with ethylene to form derivatives of butadiene. The selective action of the catalyst of the present invention makes possible the production of isoprene substantially without the concurrent production of its isomer piperylene by operating at relatively low temperatures. Similarly, the catalyst of the present invention acetalizes ketones to form the corresponding acetal, dealcoholates these acetals to remove one molecule of alcohol and form an unsaturated ether followed by condensing the ether with ethylene to form a butadiene derivative. For the selective production of isoprene from acetone diethyl acetal the temperature should not substantially exceed 150° C.

In view of the above, it will be seen that the several objects of the invention are achieved and other advantageous results attained.

As many changes could be made in the above processes and products without departing from the scope of the invention, it is intended that all matter contained in the above description shall be interpreted as illustrative and not in a limiting sense.

I claim:

1. The method of preparing isoprene which comprises reacting acetone acetal with ethylene at a temperature not substantially in excess of 150° C., and in the presence of a composite catalyst comprising granules of a base metal selected from the group consisting of aluminum, magnesium and zinc, said granules being fused to and thinly coated by a partially reduced oxide of a metal selected from family A, groups V and VI of the periodic system.

2. The method of preparing isoprene which comprises reacting acetone acetal with ethylene at a temperature not substantially in excess of 150° C., and in the presence of a composite catalyst comprising granules of a base metal selected from the group consisting of aluminum, magnesium and zinc, said granules being fused to and thinly coated by a partially reduced oxide of a metal selected from family A, groups V and VI of the periodic system, together with a metal chosen from a group consisting of copper, gold, silver and mercury.

3. The method of preparing isoprene which comprises reacting acetone acetal with ethylene at a temperature not substantially in excess of 150° C., and in the presence of a composite catalyst comprising granules of a base metal selected from the group consisting of aluminum, magnesium and zinc, said granules being fused to and thinly coated by a partially reduced oxide of a metal selected from family A, groups V and VI of the periodic system, together with an acidic refractory oxide chosen from the group consisting of the oxides of silicon, titanium, zirconium, tin, cerium, boron, thorium, and phosphorus.

4. The method of dehydrating a ketone acetal while simultaneously coupling it with ethylene which comprises carrying out said reaction at a temperature not substantially in excess of 150° C., and in the presence of a composite catalyst comprising granules of a base metal selected from a group consisting of aluminum, magnesium and zinc, said granules being fused to and thinly coated by a partially reduced oxide of a metal selected from family A, groups V and VI of the periodic system.

5. The method of dehydrating a ketone acetal while simultaneously coupling it with ethylene which comprises carrying out said reaction at a temperature not substantially in excess of 150° C., and in the presence of a composite catalyst comprising granules of a base metal selected from a group consisting of aluminum, magnesium and zinc, said granules being fused to and thinly coated by a partially reduced oxide of a metal selected from family A, groups V and VI of the periodic system, together with a metal chosen from a group consisting of copper, silver, gold and mercury.

6. The method of dehydrating a ketone acetal while simultaneously coupling it with ethylene which comprises carrying out said reaction at a temperature not substantially in excess of 150° C., and in the presence of a composite catalyst comprising granules of a base metal selected from a group consisting of aluminum, magnesium and zinc, said granules being fused to and thinly coated by a partially reduced oxide of a metal selected from family A, groups V and VI of the periodic system, together with an acidic refractory oxide chosen from the group consisting of the oxides of silicon, titanium, zirconium, tin, cerium, boron, thorium and phosphorus and a metal chosen from the group consisting of copper, silver, gold and mercury.

7. The method of dehydrating a ketone which comprises acetalizing said ketone to form a diacetal thereof, de-alcoholating said acetal to remove one molecule of alcohol and form an ether, and reacting said ether with ethylene at a temperature not substantially in excess of 150° C., said reactions being carried out in the presence of a composite catalyst comprising granules of a base metal selected from the group consisting of aluminum, magnesium and zinc, said granules being fused to and thinly coated by a partially reduced oxide of a metal selected from family A, groups V and VI of the periodic system, together with an acidic refractory oxide chosen from the group consisting of the oxides of silicon, titanium, zirconium, tin, cerium, boron, thorium and phosphorus, and also with a metal selected from the group consisting of copper, silver, gold and mercury.

WILLIAM J. HALE.

REFERENCES CITED

The following references are of record in the file of this patent:

UNITED STATES PATENTS

| Number | Name | Date |
|---|---|---|
| 1,218,332 | Stern | Mar. 6, 1917 |
| 2,204,157 | Semon | June 11, 1940 |

FOREIGN PATENTS

| Number | Country | Date |
|---|---|---|
| 313,426 | British | June 10, 1929 |
| 15,806 | British | July 2, 1914 |

OTHER REFERENCES

Kambara, J. Soc. Chem. Ind. Japan, 43, No. 8. 262B–263B (1940) 260–681